Patented Sept. 14, 1948

2,449,076

UNITED STATES PATENT OFFICE 2,449,076

PROCESS OF EXTRACTING ANTIDIABETIC SUBSTANCE FROM PANCREAS

Carl Ludwig Lautenschläger and Fritz Lindner, Frankfort-on-the-Main, Germany; vested in the Attorney General of the United States No Drawing. Application March 25, 1943, Serial No. 480,595. In Germany January 29, 1938

1 Claim. (Cl. 167—75)

This invention is a continuation-in-part of our U. S. application Serial No. 253,340, filed January 28, 1939, now abandoned for: "Blood sugar lowering substance obtained from the pancreas and a process of preparing it" in the name of Carl Ludwig Lautenschläger and Fritz Lindner.

The present invention relates to an anti-diabetic product which can be isolated from the pancreas of animals and is useful as an antidiabetic agent, particularly in that it possesses a protracted action in lowering the blood sugar level.

The isolated anti-diabetic component of the pancreas, known as "insulin," is a well defined albuminous substance crystallizable in the form of its zinc salt, and by virtue of its molecular weight it has been classified as an albuminose. The properties of this product have been exactly determined. For instance, it has quite a sharp iso-electrical point at a pH-value of between about 5.3 to about 5.5, which, however, to a certain extent is determined by the nature of accompanying substances. Below a pH-value of 4 and above a pH-value of 6, this form of the isolated hormone is readily soluble in water.

A large number of processes are known for the isolation of the anti-diabetic substance from the pancreas. The operating conditions employed in these processes are based on the discovery of Best and Banting that the hormone is, rather, sensitive to chemical and physical action, particularly to the influence of albumen-splitting ferments which are present in the pancreas besides the hormone. It was more or less clearly intended that the hormone should be obtained by these processes in a form in which it is as far as possible freed from accompanying substances, since it was generally assumed that an anti-diabetic agent of particularly high efficacy could be obtained only in this manner.

In distinction from this, it is an object of the present invention to isolate the hormone or antidiabetic substance more nearly in the form in which it is present in the pancreas. We have found that the product hitherto known as "insulin" does not constitute the native form of the hormone, but is a cleavage product of a true complex compound present in the pancreas. We were, therefore, confronted with the problem of isolating a product which would more closely resemble the natural form of the blood sugar lowering agent in the pancreas and to determine what its physical effect might be.

We have discovered that this object can be accomplished by applying operating conditions of the isolating methods which take regard to the sensitive nature of the active substance against chemical and physical actions, even more than do the known methods. As a result, we have obtained an active substance which possesses better solubility properties in an aqueous medium than the hitherto known active agent. The new product is insoluble in water in a pH-range of between about 6 to about 8, whereas, as has been pointed out, the known hormone is readily soluble in water above a pH-value of 6. The new antidiabetic product is, therefore, insoluble at the pH-value predominating in the human blood, and this property entails a retardation of the rate of resorption of the substance upon injection in the form of an aqueous suspension, or in other words, it causes a prolonged action of the new susbtance. This result is obtained without the addition of any physiologically incompatible substance, thus establishing a particularly useful improvement, since the effect of each single injection per unit of time is prolonged thereby and the number of injections required might be reduced. Simultaneously, the action of each injection is uniformly extended for a prolonged period, and the occasional hypoglycaemia which usually follows the injection of hitherto known hormone preparations does not occur.

The known isolation methods comprise a series of steps beginning with the treatment of the fresh glands for the purpose of preserving and cleaning them, followed by extraction of the active principle from the gland and its precipitation from the extract accompanied by various expedients aiming at the purification and concentration of the precipitate. We have found that in order to isolate the new product, it is advantageous that these various steps be performed at low temperatures, that any intermediate products, prior to the isolation of the final substance, be worked up rapidly, and that phase of the process which is carried out in the alkaline range should be shortened as much as possible and should preferably consume only a few minutes. This shortening of the alkaline treatment is particularly essential, and may be attained by centrifuging the precipitate formed upon addition of alkali to an extract as rapidly as possible, and then acidifying the material at once. Alternately, it may be suitable to acidify the solution before removing the precipitate formed by the addition of alkali, and then to centrifuge the solution until it has been clarified.

According to the present invention, the pancreas gland may be extracted in fresh condition.

However, fresh glands which have been preserved by an acid treatment combined with a low cooling treatment in the usual manner, may likewise be used with the same result. This is essential for the working up of the glands procured from slaughter-houses which are not situated near the extraction plant.

Details of the new isolation methods may be gathered from the examples given herein. It should be observed that it is characteristic for all variations of our invention that the active substance must be precipitated from the final solution by adjusting this solution to a pH-value between about 6 and about 8.

A substance precipitating at the high pH-value just mentioned has already been observed in the performance of the known process for the preparation of the hormone. This substance, however, has been found not to be an antidiabetic product, and it has a character quite different from that of the active component obtainable by the present invention. It has been recognized as a ballast substance in the manufacture of the hormone of the pancreas and has been discarded. In view of the known sensitivity of the hormone to chemical and physical actions, it has also been proposed to perform the extraction and precipitation steps as mildly as possible. But an active substance having the properties herein disclosed has never been obtained. The operating conditions employed are new. In this connection, it should be emphasized that the invention is not limited to the steps indicated in the present examples, but includes all variations of these steps which may yield the same complex compound. For instance, an exact limitation as to temperatures and time periods of treatment is impossible, since deviations from optimum conditions do not necessarily make the new methods inoperative, but might merely result in smaller yields or in products of lesser degrees of purity. All modifications are within the purview of our invention, and the claims which read to a reactive substance which has been precipitated from the final solution by adjusting it to a pH-value between about 6 and about 8.

In the raw state, the new product contains from 8 to 16 international units per milligram, the degree of purity widely depending on the nature of the base material. After purification by precipitation the product is obtained in a condition of remarkably high uniformity and contains between 12 and 16 international units per milligram.

The analytic figures found for the most important constituents of the new product in comparison with crystallized "insulin" are shown in the following table:

|  | Crystallized "Insulin" | New Product |
|---|---|---|
|  | Per cent | Per cent |
| Nitrogen | 15.4 | 16.8 |
| Arginine | 2.8 | 9 |
| Histidine | 3.73 | 4 |
| Lysine | 2.6 | 6.5 |
| Cystine | 13.4 | 9.5 |
| Tyrosine | 11 | 7.5 |

It results therefrom that the new product as compared with the crystallized "insulin" shows a higher content of nitrogen which is obviously due to the higher content of basic constituents, especially arginine and lysine. In contradistinction thereto, the content of crystine and tyrosine is considerably lower than in the case of the crystallized "insulin."

Since it was furthermore possible to obtain crystallized "insulin" by careful fermentative cleavage of the new product, it derives from these results that the new product is a combination of the usual "insulin" with further albuminous substances of basic nature.

For the purpose of further clarification, the behaviour of the new product during electrophoresis was examined and the molecular weights were determined.

By electrophoresis it was clearly found that in solutions of pH=3.5 and 4.2 the new product represents a uniform substance and that no substances of other molecular weight and charge are present.

This surprising fact was confirmed by the molecular weight determinations carried through according to the ultra-centrifuge method as well as with the aid of osmotic pressure.

The following examples serve to illustrate the invention, but they are not intended to limit it thereto:

1. 20 kilos of pancreas of cattle are removed immediately after slaughter, freed from fat and connective tissue, cut into small pieces and introduced into a mixture of 6 kilos of finely ground ice, 4 litres of water and 540 cc. of concentrated hydrochloric acid. The whole is vigourously stirred until the main quantity of the ice has melted and is then frozen in a freezing mixture. The deposit is brought in a hard frozen state to the place where it is to be further treated and is there ground in a mixture cooled to 0° C. of 54 litres of alcohol of 99.8 per cent strength and 6.5 litres of water. The whole is stirred for 12 hours at 0° C. and filtered. The residue is further stirred for 2 hours at about 10° C. with 40 litres of alcohol, 28 litres of water and 100 cc. of concentrated hydrochloric acid and the mixture is again filtered. The extracts are cooled to 0° C. and divided into portions of 15 litres which are standardized by means of concentrated ammonia to a pH-value of 7.4 to 7.6 and rapidly centrifuged until clear. The clear solutions are then immediately acidified by means of dilute sulfuric acid to a pH-value of 3. The united acid solutions are concentrated under reduced pressure to 10 litres. The solution is standardised to a pH-value of 2.8 and the fat is removed by extracting with ether. The clear solution is precipitated by means of 25 per cent of sodium chloride, the precipitate is allowed to stand over night and filtered; then it is introduced into 1200 cc. of water and precipitated by means of 15 per cent of sodium chloride. The second sodium chloride precipitate is dissolved in 2 litres of water and the pH-value of the solution is standardized to 7.2 to 7.4. The flocculent precipitate obtained is centrifuged immediately, washed with water and dried with acetone and ether. 4 grams of a preparation are thus obtained which contains about 15 units per milligram and has a marked prolonged action when injected in the form of an aqueous suspension.

2. 20 kilos of glands of cattle are removed about a quarter of an hour after slaughter, freed from fat and connective tissue and immediately frozen by means of a low cooling process with a freezing liquor or by means of solid carbon dioxide. The further treatment is carried out as described in Example 1.

3. 20 kilos of mutton glands are removed as soon as possible after slaughter; they are prepared and immediately ground in a mixture cooled to 0° C. of 54 litres of alcohol, 16.5 litres of water and 540 cc. of concentrated hydrochloric acid. The whole is further treated as described in Example 1.

4. 100 kilos of glands of cattle which have been pretreated as described in Example 1 are ground in a mixture of 270 litres of alcohol of 99.8 per cent strength and 32.5 litres of water. The extraction is performed as described in Example 1, only during the first extraction the temperature is gradually raised to 10° C. to 15° C. The extracts obtained are then adjusted at 10° C. to 15° C. with concentrated ammonia to a pH-value of 7.4 to 7.6 and then brought at once to a pH-value of 2.5 to 3 by the addition of sulfuric acid of 50 per cent strength. The whole is then centrifuged until a clear solution is obtained which is further treated as described in Example 1 until the second precipitation with sodium chloride is complete. This second sodium chloride precipitate is dissolved in 2.5 litres of water, the solution is mixed with 20 grams of sodium chloride and then adjusted by means of N-caustic soda solution to a pH-value of 6.8 to 7. The precipitate is centrifuged and dried and the filtrate is further treated as normal hormone. Per 1 kilo of pancreas there are obtained about 20–25 g. of the new preparation and containing 5–10 units per milligram about 500 to 1000 units of normal hormone.

5. 100 kilos of glands of calf which were removed immediately after slaughter and preserved at a low temperature are ground in the frozen condition in a mixture of 270 litres of alcohol of 99.8 per cent strength, 82.5 litres of water and 5.4 litres of hydrochloric acid (1:1). The further treatment until the second sodium chloride precipitate is obtained is the same as described in Example 4. This second sodium chloride precipitate is dissolved in 6 litres of water and adjusted by means of N-ammonia to a pH-value of 7. The precipitate is at once centrifuged and dried and the mother liquor is worked up as normal hormone. Per 1 kilo of glands there are obtained about 8000 units of the new preparation and 2000 to 4000 units of normal hormone.

6. 100 kilos of glands of cattle which have been pretreated as described in Example 1 are ground in a mixture of 270 litres of alcohol of 99.8 per cent strength and 32.5 litres of water. The extraction is performed as described in Example 1, only during the first extraction the temperature is gradually raised from 10° C. to 15° C. The extracts obtained are then adjusted at 10° C. to 15° C. with concentrated ammonia to a pH-value of 7.4 to 7.6 and then brought at once to a pH-value of 2.5 to 3 by the addition of sulfuric acid of 50 per cent strength. The whole is then centrifuged until a clear solution is obtained which is further treated as described in Example 1 until the second precipitation with sodium chloride is complete. This second sodium chloride precipitate is dissolved in 2.5 litres of water, the solution is mixed with 20 grams of sodium chloride and then adjusted by means of N-caustic soda solution to a pH-value of 6.5. The precipitate is centrifuged and dried and the filtrate is further treated as normal hormone. Per 1 kilo of pancreas there are obtained about 2000 to 2500 units of the new preparation and about 500 to 1000 units of normal hormone.

7. 100 kilos of glands of calf which were removed immediately after slaughter and preserved at a low temperature are ground in the frozen condition in a mixture of 270 litres of alcohol of 99.8 per cent strength, 82.5 litres of water and 5.4 litres of hydrochloric acid (1:1). The further treatment until the second sodium chloride precipitate is obtained is the same as described in Example 1. This second sodium chloride precipitate is dissolved in 6 litres of water and then adjusted by means of N-ammonia to a pH-value of 6.5. The precipitate is at once centrifuged and dried and the mother liquor is worked up as normal hormone. Per kilo of glands there are obtained about 8000 units of the new preparation and 2000 to 4000 units of normal hormone.

We claim:

The process which comprises extracting the pancreas with a mixture of alcohol and hydrochloric acid at a temperature ranging from freezing to 15° C., separating the liquid extract from the remaining solid, adding ammonia to the liquid extract until the pH of the liquid extract is about 7.5, whereby a precipitate forms in the mother liquid, immediately separating such precipitate from the mother liquid by rapid centrifugating, immediately adjusting the pH of the liquid to about 3, concentrating said liquid by distillation under reduced pressure, adding to the concentrated liquid a solution of sodium chloride to cause the formation of a precipitate, separating the precipitate, dissolving the same in water, treating the resulting solution with a weaker solution of sodium chloride than that previously employed to produce a precipitate, dissolving said precipitate in water adjusting the solution to a pH value between about 6 and 8 and isolating the precipitate thus formed.

CARL LUDWIG LAUTENSCHLÄGER.
FRITZ LINDNER.

REFERENCES CITED

The following references are of record in the file of this patent:

UNITED STATES PATENTS

| Number | Name | Date |
|--------|------|------|
| 1,469,994 | Banting et al. | Oct. 9, 1923 |
| 1,520,673 | Walden | Dec. 23, 1924 |
| 1,547,515 | Murlin | July 28, 1925 |
| 1,626,044 | Macy | Apr. 26, 1927 |

OTHER REFERENCES

Carbohydrate Metabolism and Insulin by Macleod, 1926, pages 70 to 77.

Chemical and Physiological Properties of the Internal Secretions by Dodds and Dickens, 1925, pages 7 to 26.

Chemical Abstracts, vol. 21, 1927, article by Sordelli in pp. 3252 and 3253.

New & Nonofficial Remedies, Jan. 1, 1938, pages 339 to 344.